US010846211B2

(12) United States Patent
Bond et al.

(10) Patent No.: US 10,846,211 B2
(45) Date of Patent: Nov. 24, 2020

(54) TESTING KERNEL MODE COMPUTER CODE BY EXECUTING THE COMPUTER CODE IN USER MODE

(71) Applicant: Microsoft Technology Licensing, LLC, Redmond, WA (US)

(72) Inventors: Barry C. Bond, Redmond, WA (US); Patrice Godefroid, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 15/927,726

(22) Filed: Mar. 21, 2018

(65) Prior Publication Data

US 2019/0294537 A1 Sep. 26, 2019

(51) Int. Cl.
*G06F 11/00* (2006.01)
*G06F 11/36* (2006.01)
*G06F 12/06* (2006.01)
*G06F 12/02* (2006.01)

(52) U.S. Cl.
CPC ........ *G06F 11/3692* (2013.01); *G06F 11/362* (2013.01); *G06F 11/3636* (2013.01); *G06F 11/3664* (2013.01); *G06F 11/3684* (2013.01); *G06F 11/3688* (2013.01); *G06F 12/0223* (2013.01); *G06F 12/0646* (2013.01); *G06F 2212/1008* (2013.01)

(58) Field of Classification Search
CPC .. G06F 11/366; G06F 11/3476; G06F 11/348; G06F 12/0646; G06F 12/0223
See application file for complete search history.

(56) References Cited

U.S. PATENT DOCUMENTS

| 5,245,274 | A | * | 9/1993 | Youngquist | ............. | G01W 1/16 324/202 |
| 5,450,586 | A | * | 9/1995 | Kuzara | ............... | G06F 11/3466 714/1 |
| 6,738,928 | B1 | * | 5/2004 | Brown | ................ | G06F 11/2268 714/26 |
| 7,437,612 | B1 | * | 10/2008 | Cantrill | ..................... | G06F 9/52 707/999.202 |

(Continued)

FOREIGN PATENT DOCUMENTS

CN          102346708 A      2/2012

OTHER PUBLICATIONS

Saito, "Jockey: A Userspace Library for Recordreplay Debugging", Sep. 2005, ACM, pp. 69-76 (Year: 2005).*

(Continued)

*Primary Examiner* — Bryce P Bonzo
*Assistant Examiner* — Jeison C Arcos
(74) *Attorney, Agent, or Firm* — Medley, Behrens & Lewis, LLC

(57) ABSTRACT

Described herein are technologies related to testing computer code for bugs, wherein the computer code is to run in kernel mode of an operating system. The computer code is executed in kernel mode of a first operating system, and content of memory that is mapped to kernel mode address space of the first operating system is transferred to user mode memory that is mapped to user mode address space of a second operating system. The computer code is executed in user mode and tested while being executed in user mode.

20 Claims, 6 Drawing Sheets

(56) References Cited

U.S. PATENT DOCUMENTS

| | | | |
|---|---|---|---|
| 7,653,899 B1 | 1/2010 | Lindahl et al. | |
| 8,239,167 B2* | 8/2012 | Ramacher | G06F 11/0748 702/183 |
| 8,381,192 B1 | 2/2013 | Drewry et al. | |
| 2004/0006546 A1* | 1/2004 | Wedlake | G06Q 10/04 706/46 |
| 2004/0025093 A1* | 2/2004 | Willy | G06F 11/3676 714/54 |
| 2004/0111707 A1* | 6/2004 | Bliss | G06F 11/362 717/129 |
| 2005/0091520 A1* | 4/2005 | Khan | G06F 11/3648 713/194 |
| 2005/0102578 A1* | 5/2005 | Bliss | G06F 11/3476 714/38.11 |
| 2005/0120162 A1* | 6/2005 | Sivaram | G06F 11/0778 711/101 |
| 2007/0094532 A1* | 4/2007 | Sengupta | G06F 11/3632 714/5.1 |
| 2008/0077780 A1* | 3/2008 | Zingher | G06F 11/3636 712/227 |
| 2008/0126879 A1* | 5/2008 | Tiwari | G06F 11/0712 714/46 |
| 2009/0106278 A1* | 4/2009 | Ramacher | G06F 11/0748 |
| 2010/0306600 A1* | 12/2010 | Shinboku | G06F 11/0775 714/48 |
| 2011/0107389 A1* | 5/2011 | Chakarapani | H04N 17/004 725/132 |
| 2013/0042154 A1* | 2/2013 | Agarwal | G06F 11/3612 714/38.14 |
| 2015/0317477 A1* | 11/2015 | Piper | G06F 11/0748 726/23 |
| 2015/0324254 A1 | 11/2015 | Prasad et al. | |
| 2016/0124835 A1* | 5/2016 | Davis | G06F 11/366 714/38.1 |
| 2017/0371734 A1* | 12/2017 | Gadi | G06F 11/0778 |
| 2018/0225063 A1* | 8/2018 | Singhvi | G06F 3/0656 |

OTHER PUBLICATIONS

"International Search Report and Written Opinion Issued in PCT Application No. PCT/US19/021729", dated Jun. 3, 2019, 18 Pages.

Jurczyk, Mateusz, "A Year of Windows Kernel Font Fuzzing #2: The Techniques", Retrieved From: <<https://googleprojectzero.blogspot.com/2016/07/a-year-of-windows-kernel-font-fuzzing-2.html>>, Jul. 1, 2016, 9 Pages.

* cited by examiner

TESTING KERNEL MODE COMPUTER CODE BY EXECUTING THE COMPUTER CODE IN USER MODE

BACKGROUND

Modern operating systems that run on computing devices create two separate virtual address spaces to store instructions and data; user mode address space and kernel mode address space. When code stored in user mode address space is executed by a processor, the processor and code are deemed to be running in user mode, while when code stored in kernel mode address space is executed by the processor, the process and code are deemed to be executing in kernel mode. In general, the processor executes applications (such as web browsers, word processing applications, email applications, etc.) in user mode, while the processor executes core operating system components (including the operating system kernel and at least some drivers) in kernel mode. When a user mode application is initiated, the operating system creates a process for such application, wherein the process provides the application with a private virtual address space. Because the virtual address space is private, data belonging to the application cannot be altered by another application executed by the processor. In other words, each application executed in user mode is run in isolation, and when an application crashes, the crash does not impact another application being run in user mode.

In contrast, all code that runs in kernel mode shares a single virtual address space. Thus, a driver running in kernel mode is not isolated from other drivers running in kernel mode and is further not isolated from the operating system kernel itself. Thus, if a driver running in kernel mode (or other computer-executable code running in kernel mode) writes to an improper virtual address in the kernel mode address space, data that belongs to the operating system or another driver may be compromised. If a kernel mode driver crashes, such crash may cause the entire operating system to crash.

Dynamic analysis tools have been developed for testing computer code for bugs and/or security faults prior to widespread release of applications constructed based upon the computer code. For example, tools have been developed to perform fuzzing on computer code. A fuzzing tool is an automated software testing tool that provides invalid, unexpected, or random data as input to a computer program. After initiating the computer program with the inputs referenced above, the fuzzing tool creates execution traces of the computer program and searches the traces for crashes, failing built-in code assertions, potential memory leaks, and the like.

Conventionally, fuzzing tools have been limited to testing computer code that runs in user mode. This is at least partially due to the isolated environment in which user mode applications run. Contrarily, currently-existing fuzzing tools are not well-suited to test computer code that runs in kernel mode, due to the oftentimes complex nature of resource sharing that occurs in kernel mode. With more specificity, conventional fuzzing tools are currently not equipped to capture and analyze execution traces of computer code that is run in kernel mode. Existing approaches for fuzzing code that is run in kernel mode are computationally expensive and slow—these existing approaches simulate an entire computing environment, and then execute the entire operating system (the kernel and drivers) as well as user mode applications inside the simulation. Further, a virtual machine must be instrumented to collect execution traces from the operating system, which is both very slow and very noisy, as the execution traces will include many functions that are unrelated to the computer code being tested, such as timer interrupts, background threads, etc.

SUMMARY

The following is a brief summary of subject matter that is described in greater detail herein. This summary is not intended to be limiting as to the scope of the claims.

Described herein are various technologies pertaining to fuzzing computer code that is to execute in kernel mode. A debugging tool can be initiated on a computing system that executes an M-bit operating system (a first operating system), wherein M in an example, can be 32. Computer code that is to execute in kernel mode of the first operating system is loaded into the debugger, and a developer can set a breakpoint with respect to the computer code at a location of the choosing of the developer. For example, when the computer code is a function or driver, the breakpoint can be set at a call to the function or driver. The computer code is then loaded into kernel mode address space of the first operating system, and the developer sets forth input that causes the breakpoint to be triggered when instructions in the kernel mode address space are executed by the processor. Responsive to the breakpoint being triggered, a file that is indicative of the content of memory mapped to the kernel mode address space is generated. For example, the file can be a dump file, which is conventionally generated when an operating system crashes. Dump files are typically used for off-line debugging. In the technology described herein, however, the dump file is employed to reconstruct the content of the memory in the kernel mode address space, and that reconstructed content is used for on-line debugging.

The dump file is then received by a second computing system that executes an N bit operating system (a second operating system), where N is greater than M For instance, the second operating system can be a 64-bit operating system. Because of the larger address space that can be assigned using N bits, there may be more virtual address space that can be assigned by the second operating system for both user mode and kernel mode processes than can be assigned by the first operating system. The second computing system, as noted above, receives the dump file, which is representative of the content of memory mapped to the kernel mode address space of the first operating system when the breakpoint in the computer code was triggered. Responsive to the second computing system receiving the dump file, the second operating system creates a new user mode process, wherein the new user mode process is assigned a relatively large address space (e.g., 4 GB). Inside this user mode address space allocated to the new user mode process, the second operating system allocates address space that maps to the kernel mode address space of the first operating system. In an example, the second operating system can allocate user mode address space from 2 GB to 4 GB inside the new user mode process.

The second computing system can then deserialize the file received from the first computing system, thereby reconstructing the content of memory in the kernel mode address space of the first operating system when the breakpoint was triggered. The second computing system populates memory of the second computing system mapped to the above-referenced user mode address space of the second operating system with the reconstructed content. Put differently, the kernel of the first operating system is placed in user mode of the second operating system. The second computing system additionally sets page protections as they were set in the kernel mode address space of the first computing system, and additionally modifies the register file of the main thread of the new user mode processes such that registers of the processor of the second computing system mimic the registers of the processor of the first computing system when the breakpoint was triggered. The second computing system can also modify some portions of the content populated in the user mode address space to ensure that the computer code runs in user mode of the second operating system. For example, the content can be searched for calls to functions for memory allocation (where these calls are used only in kernel mode) and replace such calls with calls to functions for memory allocation that can be used in user mode. Finally, the second computing system can insert a call at the top of the program stack of the new user mode process, where the call points to a function that reports success when the computer code has completed its execution (e.g., the computer code has not crashed).

Effectively, then, content of kernel mode address space of the M-bit operating system is placed in user mode address space of the N-bit operating system, with some patching undertaken to prevent the computer code from crashing due to the computer code making a call to a kernel mode-specific function. A fuzzing tool is then informed that it is to fuzz the new user mode process, and is provided with input data (e.g., generated by the developer) that is known to be valid input (e.g., the input does not cause the computer code to crash). As the fuzzing tool is fuzzing a user mode process, the fuzzing tool can act in a conventional manner; thus, the fuzzing tool can perturb the known valid input, and the fuzzing tool can monitor execution traces of the new user mode process. Therefore, from the perspective of the fuzzing tool, the fuzzing tool is fuzzing the new user mode process and doing so by perturbing a data file that the new user mode process consumes (wherein the data file was generated by the developer when the developer captured the known valid input data to a disk). The new user mode process, then, is effectively a virtual machine running a copy of the content of the kernel mode address space of the M-bit operating system, but in user mode of the N-bit operating system, where the fuzzing tool can trace and perturb its memory. Hence, a conventional fuzzing tool can be used to fuzz kernel code and drivers of an operating system. Additionally, the fuzzing tool can monitor execution of the new user mode process relatively quickly and get to the computer code of interest while no extraneous code needs to be traced. Still further, the computer code can run in user mode address space at full hardware speed with no virtualization overhead, resulting in relatively fast fuzzing of the computer code. Finally, the fuzzing tool is able to output strong success and failure indicators—if the computer code being tested returns, then the fuzzing tool did not identify a bug. When a crash happens, however, a failure occurs and the user mode process crashes.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
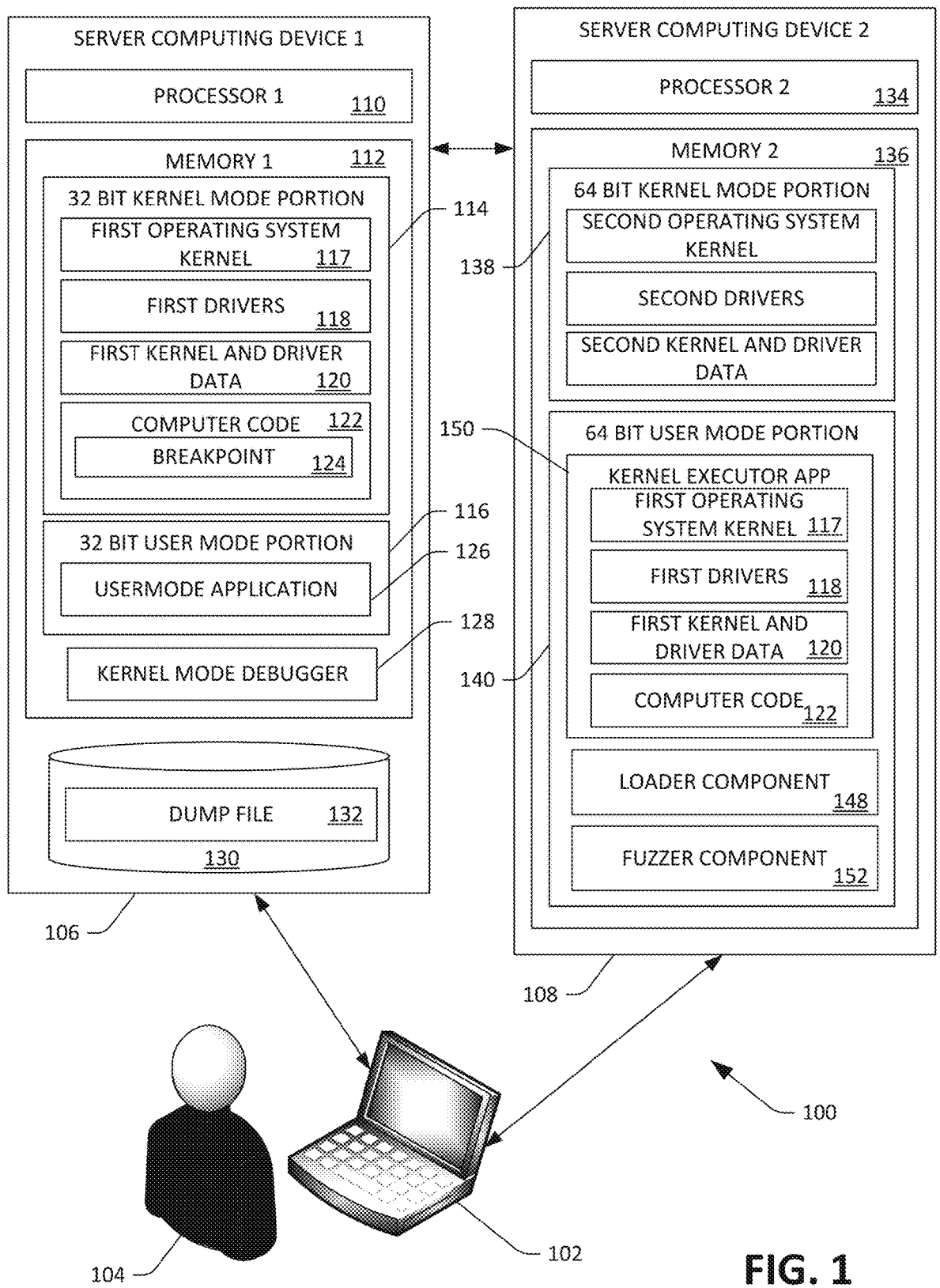
FIG. 1 is a functional block diagram of an exemplary computing system that is configured to test computer code for bugs, wherein the computer code is to run in kernel mode.

Various technologies pertaining to testing computer code that is to run in kernel mode are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference Described herein are various technologies that facilitate testing computer code for bugs, wherein the computer code is to be executed by a processor in kernel mode. As will be described in greater detail below, the computer code is loaded into kernel mode address space of a first operating system, and a copy of the content of the kernel mode address space is generated, wherein (for example), the copy represents content of memory mapped to the kernel mode address space when the computer code is ready to be called. This content is then placed in user mode address space of a second operating system and run as part of a user mode process. The computer code is tested for bugs while being run as the user mode process which allows, for example, a conventional fuzzing tool to provide various inputs to the computer code in connection with identifying successful executions of the computer code and crashes of the computer code. These technologies will be described in greater detail herein.

With reference now to FIG. 1, an exemplary system 100 that facilitates testing computer code (computer-executable instructions) for bugs is illustrated, wherein the computer code is to run in kernel mode of a computing system. The system 100 includes a client computing device 102 operated by a developer 104 of computer code. The system 100 additionally comprises a first server computing device 106 that is in network communication with the client computing device 102 and a second server computing device 108 that is in network communication with the client computing device 102 and the first computing device 106. The first server computing device 106 includes a first processor 110 and first memory 112. The first server computing device 106 executes a first operating system, wherein the first operating system is an M-bit operating system. In an example, the first operating system can be a 32-bit operating system. The first memory 112 includes a 32-bit kernel mode portion (referred to herein as a first kernel mode portion 114) that is mapped to a 32-bit kernel mode address space. The first memory 112 also comprises a 32-bit user mode portion (referred to herein as a first user mode portion 116) that is mapped to a 32-bit user mode address space 116. Accordingly, the first user mode portion 114 includes a first (32-bit) operating system kernel 117, first drivers 118 (that are executed by the processor 110 in kernel mode), and first kernel and driver data 120 (e.g., data generated and/or consumed by the first kernel 117 and/or the first drivers 118). The first kernel mode portion 114 of the first memory 112 also includes computer code 122 that is to be tested for bugs. The computer code 122 may be a driver, a portion of the kernel, etc.

The computer code 122 has a breakpoint 124 set with respect thereto. While the breakpoint 124 is shown as being included in the computer code 122, it is to be understood that the breakpoint 124 will typically be set by the developer 104 at a point just prior to the computer code 122 being executed by the first processor 110. The first user mode portion 116 can optionally have a user mode application 126 stored therein, or may be empty but reserved for user mode applications. The memory 112 may also have a kernel mode debugger 128 loaded therein, wherein the kernel mode debugger 128 is configured to generate a dump file when the breakpoint 124 is triggered (e.g., when the first processor 110 reaches the breakpoint 128 when executing instructions in the first kernel mode portion 114 of the first memory 112). The first server computing device 106 also comprises a data store 130, where the data store 130 stores a dump file 132 generated by the kernel mode debugger 128.

The second server computing device 108 comprises a second processor 134 and second memory 136. The second server computing device 108 runs an N-bit operating system, wherein N is greater than M. Thus, in the example shown in FIG. 1, the second server computing device 108 can run a 64-bit operating system.

The second memory 136 comprises a 64-bit kernel mode portion (referred to as a second kernel mode portion 138) that is mapped by the second operating system to a 64-bit kernel mode address space. The second memory 136 also includes a 64-bit user mode portion 140 (referred to as a second user mode portion 140) that is mapped by the second operating system to a 64-bit user mode address space. The second kernel mode portion 138 of the second memory 136 comprises a second (64-bit) operating system kernel 142, second drivers 144, and second kernel and driver data 146 that is generated and/or consumed by the second operating system kernel 142 and the second drivers 144.

The second user mode portion 140 of the second memory 136 comprises a loader component 148 that is configured to populate the second user mode portion 140 of the second memory 136 with content of the first kernel mode portion 114 of the first memory 112. With more particularity, the loader component 148 constructs a new user mode process that is to run in user mode at the second server computing device 108, wherein the new user mode process is referred to as a kernel executor application 150. In an example where the 64-bit user mode address space spans from 0 GB-4 GB, and the 32-bit kernel mode address space spans from 2 GB-4 GB, the loader component 148 can create the kernel executor application 150 such that 0-4 GB address space in the second user mode portion 140 of the second memory 136 is allocated to the kernel executor application 150. The loader component 148 can then deserialize the dump file 132 to reconstruct the content in the first kernel mode portion 114 of the first memory 112, and then allocate the 2 GB to 4 GB address space in the 64-bit user mode address space to the kernel executor application 150. Responsive to deserializing the dump file 132, the loader component 148 can, therefore, cause the first operating system kernel 117, the first drivers 118, the first kernel and driver data 120, and the computer code 122 to be placed in the second user mode portion 140 of the second memory 136. Because the kernel executor application 150 has been allocated the 0 GB 4 GB address space, the content of the first kernel mode portion 114 of the first memory 112 (in the 2 GB 4 GB address space) can be mapped directly to the 2 GB-4 GB address space of the user mode address space on the second server computing device 108.

As will be described in greater detail below, once the kernel executor application 150 has been created and the loader component 148 has loaded the first operating system kernel 117, the first drivers 118, the first kernel and driver data 120, and the computer code 122 into the second user mode portion 140 of the second memory 136, the kernel executor application 150 may undertake some patching on content of the second user mode portion 140 of the second memory 136 to allow for the computer code 122 to run in user mode. For instance, the computer code 122 may include a call to a function that is specific to kernel mode of an operating system (e.g., such as a call to allocate memory in kernel mode). The kernel executor application 150 can search the computer code 122 (responsive to the computer code 122 being placed in the second user mode portion 140 of the second memory 136) for the call to the function and can replace the call with a second call to a second function that is configured for use by a user mode application (e.g., where the second function is the user mode equivalent of the function). In addition, the kernel executor application 150 can modify a register file of a main thread of the kernel executor application 150, such that registers of the second processor 134 mimic registers of the first processor 110 at the time when the breakpoint 124 was reached by the first processor 110. Still further, the kernel executor application 150 can modify a call stack of the kernel executor application 150 to include a pointer to a reporting function that reports out success, wherein the reporting function is called each time that the computer code 122 is successfully executed by the second processor 134.

The second user mode portion 140 of the second memory 136 also comprises a fuzzer component 152 that is configured to test the computer code 122 for bugs (e.g., by fuzzing the computer code 122). For example, the fuzzer component 152 may be a conventional fuzzing tool that perturbs inputs to the kernel executor application 150, and thus inputs to the computer code 122. In an exemplary embodiment, responsive to the fuzzer component 152 providing an input to the kernel executor application 150 and the kernel executor application 150 being executed (or crashing), the loader component 148, the kernel executor application 150, and the fuzzer component 152 can act as described above. More specifically, the loader component 148 can create the new user mode process (the kernel executor application 150) (allocating sufficient user mode address space to the kernel executor application 150), deserialize the dump file 132, and populate the appropriate user mode address space in the second user mode portion 140 of the second memory 136. The kernel executor application 150 then performs the processes described above, and the fuzzer component 152 sets forth perturbed input to the kernel executor application 150 in connection with testing the computer code 122 for bugs.

While the computing system 100 is illustrated as including two server computing devices 106 and 108, other architectures are contemplated. For example, a single computing device can execute two virtual machines, wherein the first virtual machine runs the first operating system and the second virtual machine runs the second operating system. In another example, a single computing device can include multiple processor cores, wherein a first processor core is allocated first memory and executes the first operating system, and a second processor core is allocated second memory and executes the second operating system. It is contemplated that the system 100 can be provided as a testing service to end users, wherein a developer uploads computer code that is to be subjected to testing to a computing device or computing devices. Any suitable computing architecture that supports the transition of computer code from kernel mode to user mode is contemplated. In addition, while the second server computing device 108 is depicted as including the fuzzer component 150, other types of testing tools are contemplated and can be executed by the second server computing device 108 in addition to or alternatively to the fuzzer component 150. For instance, the second server computing device 108 can execute a heap checker, a type checker, a bounds checker, a profiler, or other tool that is usable to test software.

Exemplary operation of the system 100 is now set forth. The developer 104 accesses the client computing device 102 and initiates, for example, an application with a debugger-like graphical user interface thereon. For example, the application can be a debugger. The developer 104 reviews the computer code 122 and identifies a point with respect to the test code 124 where the breakpoint 124 is to be placed. For example, the breakpoint 124 can be placed in a position immediately after the computer code 124 being called. The application executing on the client computing device 102 also receives an input value or values from the developer 104, wherein the developer 104 knows that such values will result in the breakpoint 124 of the computer code 122 being triggered. Still further, the application can receive from the developer 104 an input value or values that can be provided to the computer code 122 after the breakpoint 124 has been triggered. This value or values can be known as being valid; the developer 104 has knowledge that provision of the value or values as input to the computer code 122 will result in the computer code 122 executing successfully. Responsive to the developer 104 placing the breakpoint 124 with respect to the computer code 122 and the application receiving the value that will cause the breakpoint 124 to be triggered and the known valid values for the computer code 122, the client computing device 102 causes the first operating system to be updated with the computer code 122 on the first server computing device 106, such that the computer code 122 is placed in the first kernel mode portion 114 of the first memory 112.

The first processor 110 then begins to execute instructions in the first kernel mode portion 114 of the first memory 112 (e.g., instructions in kernel mode address space of the first operating system). The kernel mode debugger 128 monitors the first processor 110 while the first processor 110 executes these instructions, and identifies when the first processor 110 has reached the breakpoint 124 (e.g., the kernel mode debugger 128 identifies when the breakpoint 24 is triggered). Responsive to the kernel mode debugger 128 identifying that the breakpoint 124 has been triggered, the kernel mode debugger 128 serializes the content in the first kernel mode portion 114 of the first memory 112 and creates the dump file 132. Hence, the dump file 132 is representative of content of the first kernel mode portion 114 of the first memory 112 when the breakpoint 124 was triggered.

The first server computing device 106 then transmits the dump file 132 to the second server computing device 108, whereupon the dump file 132 can be stored in a data store (not shown) of the second server computing device 108. Responsive to receiving an indication that the second server computing device 108 has received the dump file 132, the loader component 148 creates the kernel executor application 150 as a new large address-aware user mode process. Thus, the loader component 148 causes user mode address space 0 GB-4 GB to be allocated to the kernel executor application 150. The loader component 148 then deserializes the dump file 132 and writes the deserialized content into user mode address space allocated to the kernel executor application 150. With more specificity, the loader component 148 can perform a one-to-one translation, such that no addresses in the deserialized content need to be updated. With still more specificity, the kernel mode address space mapped to the first kernel mode portion 114 of the first memory 112 can be 2 GB-4 GB, and accordingly, since the loader component 148 has allocated addresses of 0 GB-4 GB in the user mode address space (of the second server computing device 108) to the kernel executor application 150, the loader component 148 can populate a part of the second user mode memory portion 140 that is mapped to user mode addresses 2 GB-4 GB with the deserialized content.

The loader component 148 can additionally transmit information to the kernel executor application 150 that informs the kernel executor application 150 as to how to set up registers of the second processor 134, wherein this information can be retrieved from the dump file 132. Once the registers of the second processor 134 are appropriately set, the second processor 134 is able to resume execution of instructions from the point where the first processor 110 ceased executing the instructions (e.g., at the breakpoint 124).

Responsive to the kernel executor application 150 having the first kernel 117, first drivers 118, first kernel and driver data 120, and the computer code 122 loaded therein at the appropriate user mode address spaces, the kernel executor application 150 performs some relatively minor patching to swap out certain kernel mode functions in the computer code 122 with their user mode equivalents. Based on the information provided by the loader component 148, the kernel executor application 150 updates the registers of the second processor 134. In addition, the kernel executor application 150 can patch a return address on the call stack for kernel executor application 150, such that the return address points to a new function that reports out a success indicator. Hence, when the second processor 134 successfully executes the computer code 122, an indication is output that the computer code 122 ran successfully (and did not crash).

Responsive to the kernel executor application 150 updating the appropriate registers of the second processor 134, patching the computer code 122, and modifying the call stack, the fuzzer component 152 causes the second processor 134 to execute the kernel executor application 150 using the valid input provided by the developer 104. The fuzzer component 152 monitors execution of the user mode kernel executor application 150 and operates as a conventional fuzzing tool. That is, the fuzzer component 152 is provided with the known valid inputs, watches the kernel executor application 150 run and generates an execution trace, and upon the kernel executor application 150 completing successfully, the fuzzer component 150 perturbs the input values. Thereafter, the loader component 148 is caused to: 1) re-generate the kernel executor application 150; 2) deserialize the dump file 132; and 3) repopulate the second user mode portion 140 with the content represented in the dump file 132. Further, the kernel executor application 150 performs the relatively minor patching described above and resets the registers of the second processor 134 (as described above). The fuzzer component 150 then provides the perturbed input values to the kernel executor application 150, and causes the second processor 134 to re-run the kernel executor application 150. When the kernel executor application 150 crashes (e.g., the fuzzer component 152 provided data at input that caused the computer code 122 to crash), an output is generated for the developer 104 to review. For instance, the developer 104 may utilize a time-travel debugger when debugging the computer code 122.

In summary, then, the kernel of one operating system is brought to the user mode of a second operating system. There are numerous advantages to this approach. First, a conventional fuzzing tool can fuzz kernel code and drivers that are to run in the kernel. Conventional fuzzing tools do not require a full virtualization of a computing system to see execution traces, and additionally, no extraneous code needs to be traced. Further, performance of the combination of the loader component 148, the kernel executor application 150, and the fuzzer component 152 is very good, as the loader component 148 needs only a few seconds to re-create an instance of the kernel executor application 150 when it crashes, and the kernel executor application 150 (which includes the computer code 122) runs at full hardware speed with no virtualization overhead. Finally, due to the patching performed by the kernel executor application 150, there are strong success and failure indicators. When the computer code 122 returns, the fuzzer component 152 does not find a bug using the input it provided. In contrast, when the kernel executor application 150 crashes, the fuzzer component 152 can output an indication that a bug exists in the computer code 122 and the developer 104 can employ a time travel debugger to better understand and address the bug.

Figure 2:
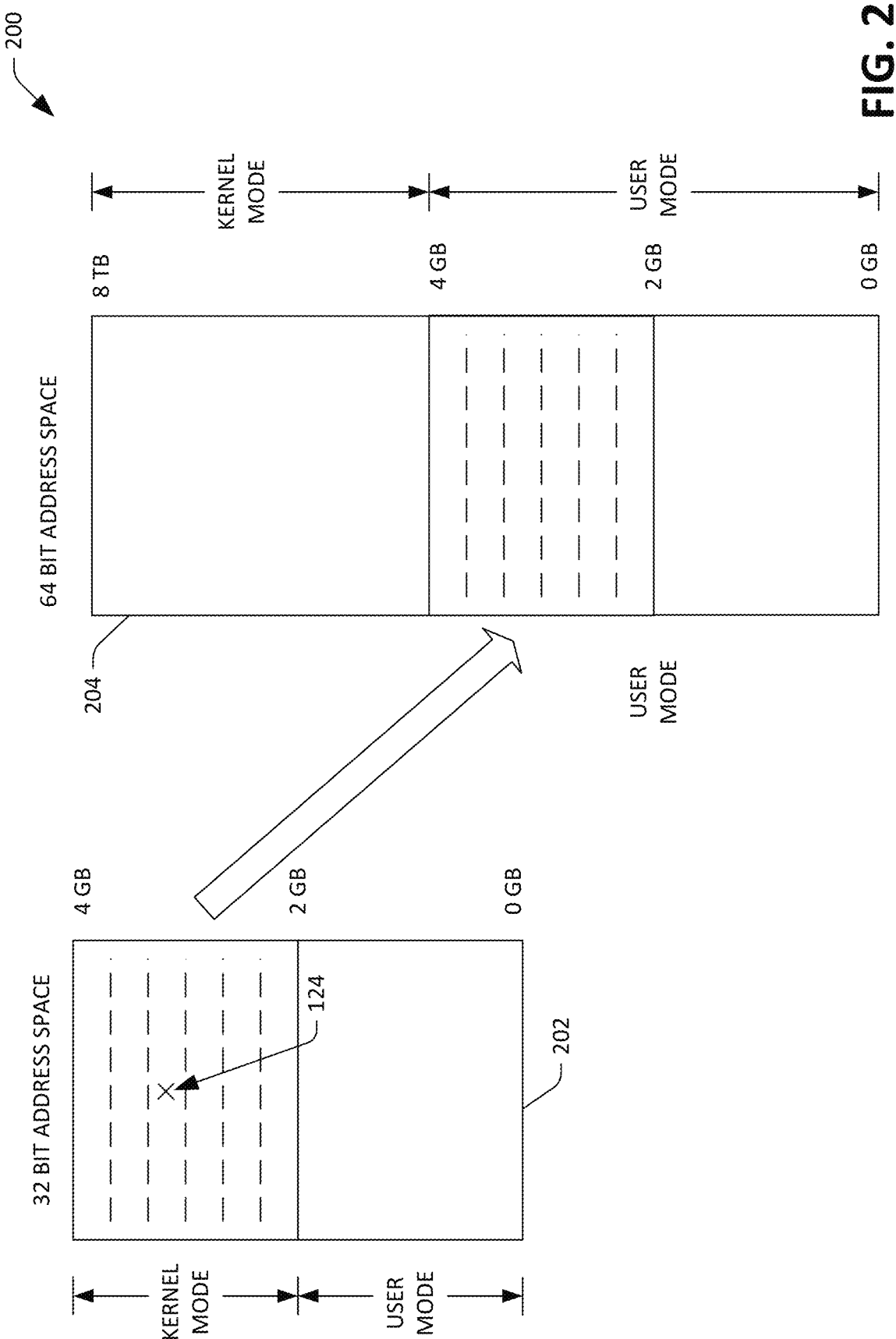
FIG. 2 is a schematic that illustrates translation of content of kernel mode address space of an M-bit operating system to user mode address space of an N-bit operating system, wherein N is greater than M.

With reference now to FIG. 2, an exemplary schematic 200 that illustrates translation of content in kernel mode address space of a 32-bit operating system into user mode address space (assigned to the kernel executor application 150) in a 64-bit operating system is illustrated. The schematic 200 illustrates virtual address space 202 allocated between the kernel of a 32-bit operating system and user mode address space. In an example, the 32-bit operating system allocates virtual addresses from 0 GB-2 GB to user mode processes and allocates virtual addresses 2 GB-4 GB to the kernel of the operating system (which includes the first operating system kernel 117, the first drivers 118, the first kernel and driver data 120, and the computer code 122). Location of the breakpoint 124 is illustrated in the 32-bit address space 202.

As described previously, the second operating system supports a 64-bit address space 204, where the second operating system allocates addresses from 0 GB-4 GB to user mode applications and allocates addresses from 4 GB-8 TB to the kernel of the 64-bit operating system. Accordingly, to allow for a one-to-one translation, such that addresses of instructions need not be translated between the 32-bit address space 202 and the 64-bit address space 204, the loader component 148 can create the kernel executor application 150 as a user mode application that is to be allocated virtual addresses from 0 GB-4 GB (which includes 2 GB-4 GB). The loader component 148 deserializes the dump file 132 and populates the virtual address space 204 from 2 GB-4 GB with content from the 32-bit address space 202 from 2 GB-4 GB. Once the kernel executor application 150 updates the registers of the second processor 134, the computer code 122 will be executed starting at the breakpoint 124. Therefore, the second processor 134 is effectively executing an instance of the kernel of the first operating system (without realizing that it is doing so).

Figure 3:
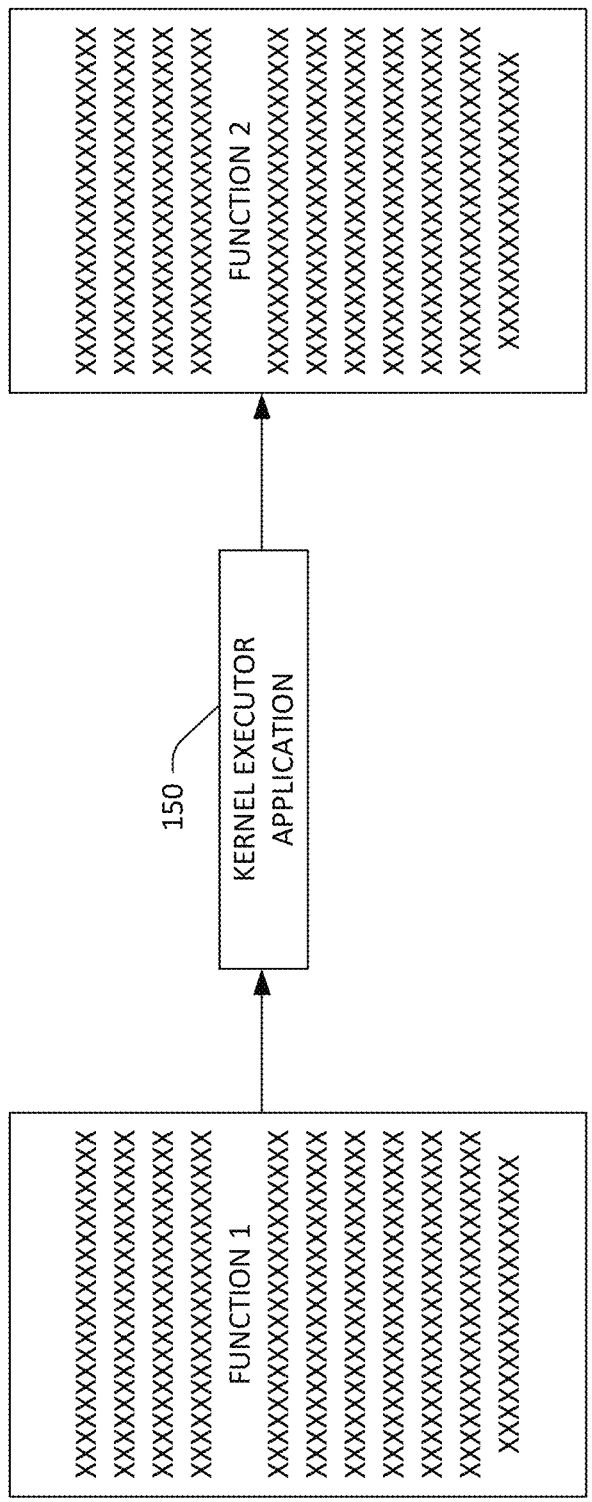
FIG. 3 is a functional block diagram of an exemplary loader component that is configured to patch computer code that is to execute in kernel mode to allow such computer code to execute in user mode.

Now referring to FIG. 3, an exemplary functional block diagram depicting operation of the kernel executor application 150 is depicted. As can be ascertained, the content in the virtual address space of 2 GB-4 GB includes a call to a first function. In an example, the first function may be a kernel-specific function for allocating memory to a kernel process. If this function were to be called by a user mode process, the user mode process will crash. Accordingly, the kernel executor application 150 can search for the call to the first function and replace the call to the first function with a call to its user mode equivalent (e.g., a call to a function to allocate memory in user mode). This operation can be performed for a plurality of functions that are known to be kernel-mode specific.

Figure 4:
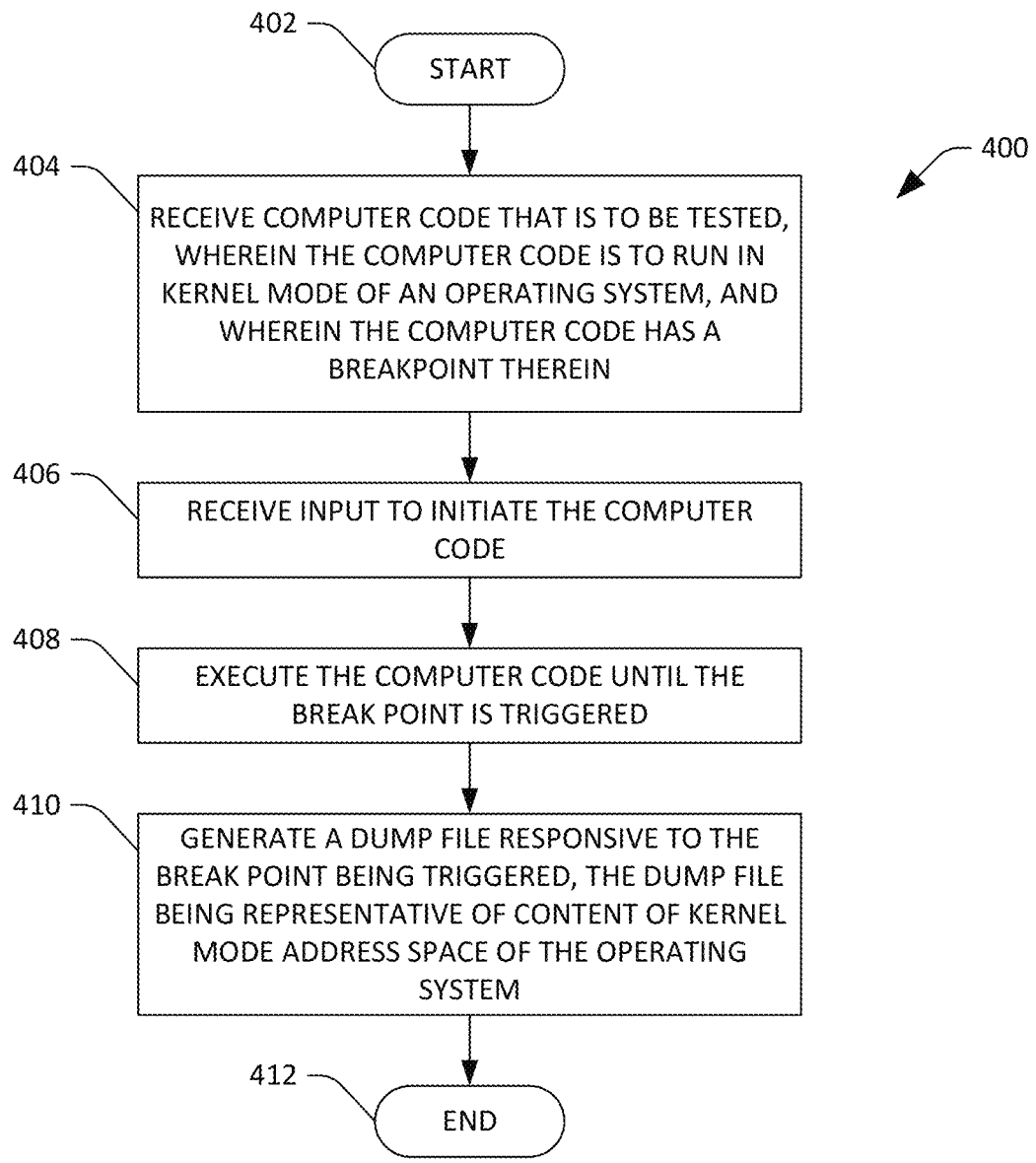
FIG. 4 is a flow diagram illustrating an exemplary methodology performed by a computing system executing an M-bit operating system, wherein the methodology facilitates generating a dump file that is representative of content of kernel mode address space of the M-bit operating system when a breakpoint with respect to computer code is triggered.
Figure 5:
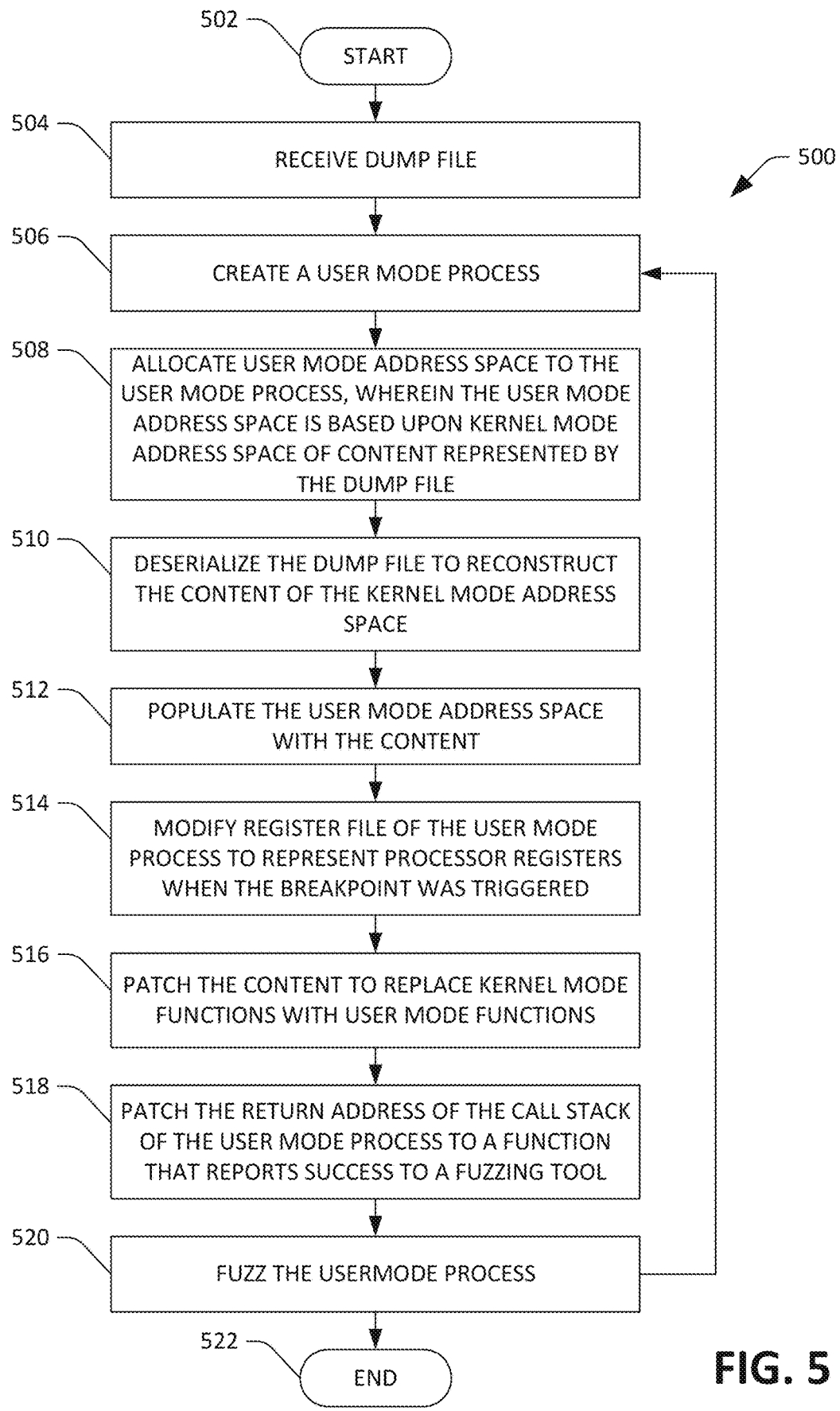
FIG. 5 is a flow diagram illustrating an exemplary methodology performed by computing system that executes an N-bit operating system, wherein the methodology facilitates fuzzing computer code that is to execute in kernel mode address space by placing such computer code in user mode address space.

FIGS. 4 and 5 illustrate exemplary methodologies relating to testing computer code that is to run in kernel mode of an operating system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 4, a flow diagram illustrating an exemplary methodology 400 that can be performed by a computing system running a first operating system (e.g., the first server computing device 106) is illustrated. The methodology 400 starts at 402, and at 404 computer code that is to be tested is received, wherein the computer code is to run in kernel mode of an operating system, and further wherein the computer code has a breakpoint positioned therein. As described previously, the computer code may be a driver, some portion of the operating system kernel, or the like. At 406, input is received that will cause the computer code to be called, and accordingly, the breakpoint to be triggered. At 408, the operating system is run until the breakpoint is triggered. At 410, a dump file is generated responsive to the breakpoint being triggered, wherein the dump file is representative of content of a portion of memory that is mapped to kernel mode address space of the operating system. Further, the dump file includes content that is representative of values of registers of a computer processor that executed the kernel of the operating system. The methodology 400 completes at 412.

Now turning out a FIG. 5, a flow diagram 500 illustrating an exemplary methodology 500 that can be executed by a computing system running a second operating system (such as the second server computing device 108) is illustrated. The methodology 500 starts at 502, and at 504 a dump file is received (e.g., the dump file generated at 410 in the methodology 400). At 506, responsive to receiving the dump file, a new user mode process is created.

At 508, user mode address space is allocated to the user mode process, wherein the user mode address space is based upon the kernel mode address space where content represented by the dump file was stored. At 510, the dump file is deserialized to reconstruct the content of the kernel mode address space when the breakpoint was triggered.

At 512, the allocated user mode address space is populated with the content reconstructed at 510. At 514, the register file of the newly created user mode process is modified to represent the processor registers of a processor (e.g., the first processor 110) when the breakpoint was triggered. At 516, the content in the user mode address space is patched by replacing calls to kernel mode functions therein with calls to their equivalent user mode functions. At 518, the return address of the call stack of the user mode process is patched to include a pointer to function that reports success to a fuzzing tool, and at 520, the user mode process is fuzzed, wherein fuzzing the user mode process comprises monitoring an execution trace of the user mode process when the user mode process is provided with an input by a fuzzing tool. The methodology 500 can return to 506, where the user mode process is created. The acts 506-520 can be repeated a threshold number of times or until a fuzzing tool (or other bug testing tool) has executed as designed. In another exemplary embodiment, the user mode process may iteratively make copies of itself, such that acts 514 and 516 can be iterated and the fuzzing tool can fuzz the copies of the user mode process. The methodology 500 completes at 522.

Examples pertaining to aspects described herein are now set forth.

Example 1

A computing system comprising: a processor; and memory that stores instructions that, when executed by the processor, cause the processor to perform acts comprising: receiving a file generated by a computing device that is representative of content of kernel mode address space of an operating system executing on the computing device, wherein the content represented by the file comprises computer code that is to be tested for bugs; based upon the file, populating a portion of the memory with the content represented by the file, wherein the portion of the memory is mapped to user mode address space of a second operating system being executed by the processor; and responsive to populating the portion of the memory with the content represented by the file, testing the computer code for the bugs, wherein testing the computer-executable instructions for the bugs comprises: executing the computer code in the user mode address space based upon an input provided to the computer code; and generating an output that is indicative of whether the computer code crashed when executed with the input.

Example 2

The computing system of example 1, wherein the computer code is comprised by a driver that is to execute in kernel space of the operating system.

Example 3

The computing system of any of examples 1-2, wherein the file is a dump file created by the operating system in response to a breakpoint being triggered when the computer code is executed in kernel mode of the operating system, wherein the breakpoint is placed in the computer code by a developer.

Example 4

The computing system of example 4, the acts further comprising: deserializing the dump file to recreate the content of the kernel mode address space of the operating system when the breakpoint was triggered; and populating the portion of the memory with the content responsive to deserializing the dump file.

Example 5

The computing system of any of examples 1-4, the acts further comprising: subsequent to populating the portion of the memory with the content, and prior to testing the computer code for bugs: searching the computer code for a call to a function that requests memory allocation in the kernel mode address space of the operating system; and replacing the call to the function with a second call to a second function, wherein the second function requests memory allocation in the user mode address space of the second operating system.

Example 6

The computing system of any of examples 1-5, wherein the operating system and the second operating system are different operating systems.

Example 7

The computing system of example 6, wherein the operating system is an M-bit operating system, and further wherein the second operating system is an N-bit operating system, wherein N is greater than M.

Example 8

The computing system of example 7, wherein populating the portion of the memory with the content represented by the file comprises allocating the portion of memory to a computer-executable application that is configured to execute in user mode of the N-bit operating system, wherein the content is placed in the portion of memory responsive to allocating the portion of memory to the computer-executable application.

Example 9

The computing system of example 8, wherein testing the computer code for bugs comprises detecting that the computer-executable application executed successfully.

Example 10

The computing system of any of examples 1-9, wherein the computer code is comprised by a portion of kernel code that is to execute in kernel space of the operating system or in kernel space of the second operating system.

Example 11

The computing system of any of examples 1-10, wherein testing the computer-executable instructions for the bugs comprises executing at least one of the following tools with respect to the computer code: a fuzzing tool, a heap checker, a type checker, a bounds checker, or a profiler.

Example 12

A method executed by a computing system that comprises at least one processor, the method comprising: executing computer code that is to be tested for bugs, the computer code executed in kernel mode of a first operating system; responsive to detecting that a break point has been triggered in the computer code when executing the computer code, generating a file that is representative of content of kernel mode memory mapped to kernel mode address space of the first operating system when the break point was triggered, wherein the break point has been set by a developer reviewing the computer code; based upon the file, populating user mode memory with the content represented by the file, wherein the user mode memory is mapped to user mode address space of a second operating system that is different from the first operating system, wherein the content in the user mode memory comprises the computer code; executing the computer code while the computer code is in the user mode memory; and identifying a bug in the computer code responsive to executing the computer code in the user mode memory.

Example 13

The method of example 12, wherein executing the computer code comprises: generating an input to provide to the computer code; and initiating execution of the computer code with the input, wherein identifying the bug in the computer code comprises identifying that the computer code crashed when initiated with the input.

Example 14

The method of any of examples 12-13, wherein the first operating system is an M-bit operating system, the second operating system is an N-bit operating system, and further wherein N is greater than M.

Example 15

The method of example 14, wherein the first operating system is a 32-bit operating system and the second operating system is a 64-bit operating system.

Example 16

The method of any of examples 12-15, further comprising executing at least one of the following tools with respect to the computer code: a fuzzing tool; a heap checker; a type checker; a bounds checker; or a profiler, wherein the bug is identified in the computer code based upon output of the at least one tool.

Example 17

The method of any of examples 12-16, wherein the file is a dump file, and further wherein populating the user mode memory with the content represented by the file comprises deserializing the file to reconstruct the content of the kernel mode memory when the breakpoint was triggered.

Example 18

The method of any of examples 12-17, further comprising: subsequent to populating the user mode memory with the content represented by the file and prior to executing the computer code while the computer code is in the user mode memory: determining that the content comprises a call to a function; and responsive to determining that the content comprises the call to the function, replacing the call to the function in the content with a second call to a second function.

Example 19

The method of any of examples 12-18, wherein populating the user mode memory with the content represented by the file comprises allocating the user mode memory to a computer-executable application that is configured to execute in user mode of the second operating system, wherein the content is placed in the user mode memory responsive to allocating the user mode memory to the computer-executable application.

Example 20

A computer-readable storage medium comprising instructions that, when executed by a processor, cause the processor to perform acts comprising: receiving a file generated by a computing device that is representative of content of kernel mode memory mapped to kernel mode address space of an operating system executing on the computing device, wherein the content represented by the file comprises computer-executable instructions that are to be tested for bugs;

based upon the file, populating user mode memory with the content represented by the file, wherein the user mode memory is mapped to user mode address space of a second operating system being executed by the processor; and responsive to populating the user mode memory with the content represented by the file, testing the computer-executable instructions for the bugs, wherein testing the computer-executable instructions for the bugs comprises: executing the computer-executable instructions in the user mode memory based upon an input provided to the computer-executable instructions; and generating an output that is indicative of whether the computer-executable instructions crash when executed with the input.

Figure 6:
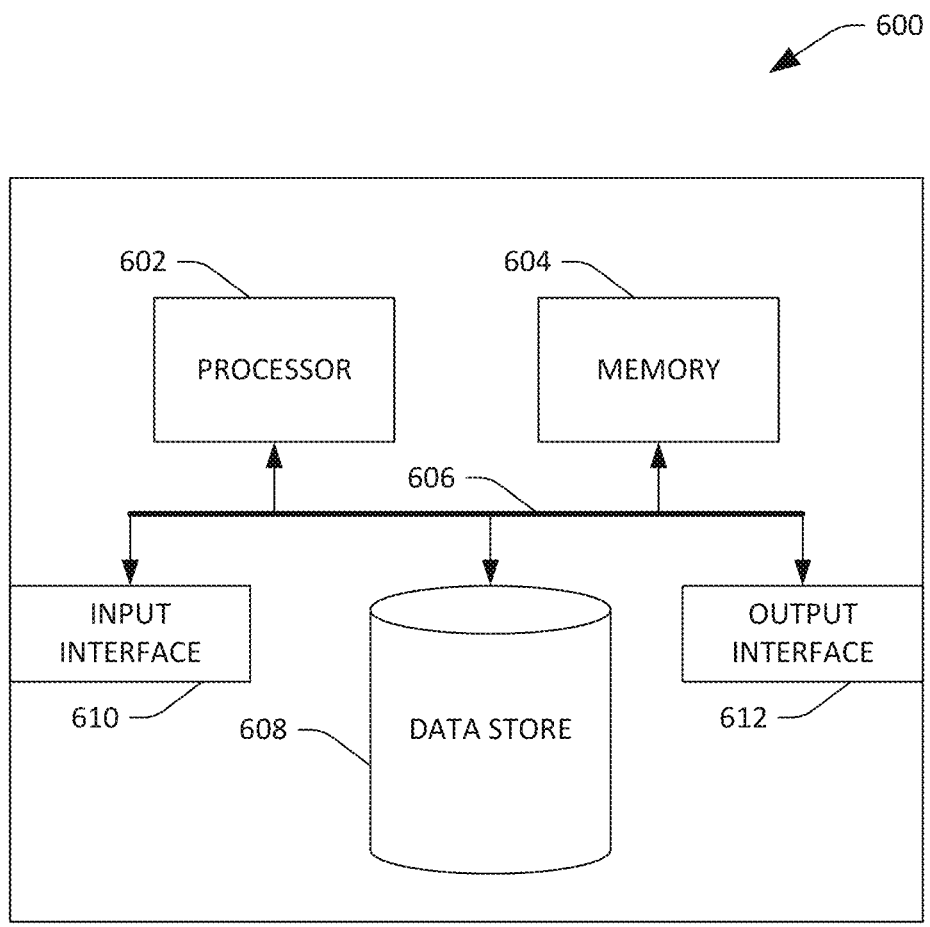
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that supports generating a dump file. By way of another example, the computing device 600 can be used in a system that supports fuzzing computer code that is to execute in kernel mode. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store kernel data, driver data, registry information, etc.

The computing device 600 additionally includes a data store 608 that is accessible by the processor 602 by way of the system bus 606. The data store 608 may include executable instructions, a dump file, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory that stores instructions that, when executed by the processor, cause the processor to perform acts comprising:
      receiving a dump file generated by a computing device that comprises content stored in kernel mode address space of an operating system executing on the computing device, wherein the content comprises computer code stored in the kernel mode address space of the operating system, wherein the computer code is to be tested for bugs, and further wherein the dump file is created by the computing device in response to a breakpoint being triggered when the computer code is executed in kernel mode of the operating system;

deserializing the dump file to recreate the content of the kernel mode address space of the operating system when the breakpoint was triggered;

populating a portion of the memory with the content including the computer code based upon the deserialized dump file, wherein the portion of the memory is mapped to user mode address space of a second operating system being executed by the processor; and responsive to populating the portion of the memory with the content, testing the computer code for the bugs, wherein testing the computer code for the bugs comprises:

executing the computer code in the user mode address space based upon an input provided to the computer code; and generating an output that is indicative of whether the computer code crashed when executed with the input.

2. The computing system of claim 1, wherein the computer code is comprised by a driver that is to execute in kernel space of the operating system.

3. The computing system of claim 1, the acts further comprising:

subsequent to populating the portion of the memory with the content, and prior to testing the computer code for bugs:

searching the computer code for a call to a function that requests memory allocation in the kernel mode address space of the operating system; and replacing the call to the function with a second call to a second function, wherein the second function requests memory allocation in the user mode address space of the second operating system.

4. The computing system of claim 1, wherein the operating system and the second operating system are different operating systems.

5. The computing system of claim 4, wherein the operating system is an M-bit operating system, and further wherein the second operating system is an N-bit operating system, wherein N is greater than M.

6. The computing system of claim 5, wherein populating the portion of the memory with the content comprises allocating the portion of memory to a computer-executable application that is configured to execute in user mode of the N-bit operating system, wherein the content is placed in the portion of memory responsive to allocating the portion of memory to the computer-executable application.

7. The computing system of claim 6, wherein testing the computer code for bugs comprises detecting that the computer-executable application executed successfully.

8. The computing system of claim 1, wherein the computer code is comprised by a portion of kernel code that is to execute in kernel space of the operating system or in kernel space of the second operating system.

9. The computing system of claim 1, wherein testing the computer-executable instructions for the bugs comprises executing at least one of the following tools with respect to the computer code: a fuzzing tool, a heap checker, a type checker, a bounds checker, or a profiler.

10. A method executed by a computing system that comprises at least one processor, the method comprising:

executing computer code that is to be tested for bugs, the computer code executed in kernel mode of a first operating system;

responsive to detecting that a break point has been triggered in the computer code when executing the computer code, generating a dump file that comprises content of kernel mode memory, wherein the content is mapped to kernel mode address space of the first operating system when the break point was triggered, wherein the content includes the computer code, and further wherein the break point has been set by a developer reviewing the computer code;

based upon the file, populating user mode memory with the content, wherein the user mode memory is mapped to user mode address space of a second operating system that is different from the first operating system, wherein the content in the user mode memory comprises the computer code, and further wherein populating the user mode memory with the content comprises deserializing the dump file to reconstruct the content of the kernel mode memory when the breakpoint was triggered;

executing the computer code while the computer code is in the user mode memory; and identifying a bug in the computer code responsive to executing the computer code in the user mode memory.

11. The method of claim 10, wherein executing the computer code comprises:

generating an input to provide to the computer code; and initiating execution of the computer code with the input, wherein identifying the bug in the computer code comprises identifying that the computer code crashed when initiated with the input.

12. The method of claim 10, wherein the first operating system is an M-bit operating system, the second operating system is an N-bit operating system, and further wherein N is greater than M.

13. The method of claim 12, wherein the first operating system is a 32-bit operating system and the second operating system is a 64-bit operating system.

14. The method of claim 10, further comprising executing at least one of the following tools with respect to the computer code:

a fuzzing tool;

a heap checker;

a type checker;

a bounds checker; or a profiler, wherein the bug is identified in the computer code based upon output of the at least one tool.

15. The method of claim 10, further comprising:

subsequent to populating the user mode memory with the content and prior to executing the computer code while the computer code is in the user mode memory:

determining that the content comprises a call to a function; and responsive to determining that the content comprises the call to the function, replacing the call to the function in the content with a second call to a second function.

16. The method of claim 10, wherein populating the user mode memory with the content comprises allocating the user mode memory to a computer-executable application that is configured to execute in user mode of the second operating system, wherein the content is placed in the user mode memory responsive to allocating the user mode memory to the computer-executable application.

17. A computer-readable storage medium comprising instructions that, when executed by a processor, cause the processor to perform acts comprising:
    receiving a dump file generated by a computing device that is representative of content of kernel mode memory mapped to kernel mode address space of an operating system executing on the computing device, wherein the content represented by the dump file comprises computer-executable instructions that are to be tested for bugs, wherein the dump file was generated in response to a break point being triggered in the computer-executable instructions;
    based upon the dump file, populating user mode memory with the content represented by the dump file, wherein the user mode memory is mapped to user mode address space of a second operating system being executed by the processor, and further wherein populating the user mode memory with the content comprises deserializing the dump file to reconstruct the content of the kernel mode memory when the breakpoint was triggered; and
    responsive to populating the user mode memory with the content represented by the dump file, testing the computer-executable instructions for the bugs, wherein testing the computer-executable instructions for the bugs comprises:
        executing the computer-executable instructions in the user mode memory based upon an input provided to the computer-executable instructions; and
        generating an output that is indicative of whether the computer-executable instructions crash when executed with the input.

18. The computer-readable storage medium of claim 17, wherein the operating system is an M-bit operating system, the second operating system is an N-bit operating system, and further wherein N is greater than M.

19. The computer-readable storage medium of claim 18, wherein the operating system is a 32-bit operating system and the second operating system is a 64-bit operating system.

20. The computer-readable storage medium of claim 17, the acts further comprising:
    subsequent to populating the user mode memory with the content and prior to executing the computer-executable instructions while the computer-executable instructions are in the user mode memory:
    determining that the content comprises a call to a function; and
    responsive to determining that the content comprises the call to the function, replacing the call to the function in the content with a second call to a second function.

* * * * *